US006397068B1

(12) United States Patent
Ganesh

(10) Patent No.: US 6,397,068 B1
(45) Date of Patent: *May 28, 2002

(54) SYSTEM AND METHOD FOR OPTIMALLY SELECTING GUARD BANDS IN A DUAL MODE NETWORK

(75) Inventor: Rajamani Ganesh, Bedford, MA (US)

(73) Assignee: Verizon Laboratories Inc., Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/528,203

(22) Filed: Mar. 17, 2000

(51) Int. Cl.$^7$ ................................................. H04Q 7/20
(52) U.S. Cl. ........................ 455/448; 455/553; 455/446; 455/67.1
(58) Field of Search ................................ 455/67.1, 423, 455/501, 446, 447, 448; 370/335, 342, 465

(56) References Cited

U.S. PATENT DOCUMENTS

| | | | |
|---|---|---|---|
| 5,218,618 A | 6/1993 | Sagey | 375/1 |
| 5,367,533 A | * 11/1994 | Schilling | 370/342 |
| 5,548,809 A | 8/1996 | Lemson | 455/34.1 |
| 5,598,430 A | 1/1997 | Hachisuka et al. | 375/216 |
| 5,642,377 A | 6/1997 | Chung et al. | 375/200 |
| 5,644,591 A | 7/1997 | Sutton | 375/200 |

(List continued on next page.)

OTHER PUBLICATIONS

Principles of CDMA, http://www.cdg.org/a ross/Principles.html., p. 1.
Spreading Codes, http://www.cdg.org.A–ross/Spreading.html, p. 1.
Reverse CDMA Channel, http://www.cdg.org.a ross/Reverse.html., p. 1–4.
Forward CDMA Channel, http://www.cdg.org/a_ross/Intro.html, p. 1–2.
Introduction to CDMA, http://www.cdg.org/A ross/Intro.html, p. 1–2.
IS–95–CDMA Systems Issues, http://www.ericsson.se/systems/D–AMPS 1900/19 35_36.htm, p.1–3.
Sivarajan, Kumar N. et al., Channel Assignment in Cellular Radio, CH2379–1/89/0000/0846, IEEE, 1989, p. 846–850.
Plehn, J., Applied Frequency Assignment, 0–7803–1927–3/94, IEEE, 1994, p. 853–857.
Recommended Minimum Standards for 800–MHZ Cellular Subscriber Units, EIA/IS–19–B, May 1998.
Recommended Minimum Standards for 800–MHZ Cellular Land Stations, EIA/IS–20–A, May 1988.
Recommended Minimum Performance Standards for Base Stations Supporting Dual–Mode Wideband Spread Spectrum Cellular Mobile Stations, PN–3645 (TIA/EIA/IS–97–A), Ballot Version, Feb. 26, 1996.
Recommended Minimum Performance Standards for Dual–Mode Wideband Spread Spectgrum Cellular Mobile Stations, TIA/EIA/IS–98–A, Published Version, Apr. 17, 1996.

*Primary Examiner*—Nay Maung
*Assistant Examiner*—Sonny Trinh
(74) *Attorney, Agent, or Firm*—Leonard Charles Suchyta; James K. Weixel

(57) ABSTRACT

A system identifies analog channels for reclamation in a dual mode system (100) having a digital network (110) overlaid on an analog network (120). The digital network (110) includes multiple digital cell sites. The analog network (120) includes multiple analog cell sites. The system measures an amount of interference caused by the analog cell sites and an amount of interference caused to the digital cell sites. The system then compares the interference amounts to one or more thresholds and determines for which of the analog channels the interference amounts exceed the thresholds. The system selects the determined analog channels for reclamation.

29 Claims, 11 Drawing Sheets

U.S. PATENT DOCUMENTS

| | | | | |
|---|---|---|---|---|
| 5,703,874 A | * | 12/1997 | Schilling | 370/335 |
| 5,708,969 A | | 1/1998 | Kotzin et al. | 455/34.2 |
| 5,734,068 A | | 3/1998 | Klopries et al. | 549/536 |
| 5,799,243 A | | 8/1998 | Ojaniemi | 455/63 |
| 5,845,209 A | | 12/1998 | Iwata | 455/423 |
| 5,864,549 A | | 1/1999 | Honkasalo et al. | 370/335 |
| 5,960,329 A | * | 9/1999 | Ganesh et al. | 455/67.1 |
| 6,011,789 A | * | 1/2000 | Schilling | 370/342 |
| 6,072,778 A | * | 6/2000 | Labedz et al. | 370/252 |
| 6,085,094 A | * | 7/2000 | Vasudevan et al. | 455/447 |
| 6,308,072 B1 | * | 10/2001 | Labedz et al. | 455/448 |

* cited by examiner

FREQUENCY OFFSET FROM CENTER FREQUENCY (KHz)

SYSTEM AND METHOD FOR OPTIMALLY SELECTING GUARD BANDS IN A DUAL MODE NETWORK

BACKGROUND OF THE INVENTION

A. Field of the Invention

The present invention relates generally to wireless communications systems and, more particularly, to a system and method for optimally selecting guard bands in a dual mode network, such as a Code Division Multiple Access (CDMA) system overlaid on an existing Advanced Mobile Phone System (AMPS).

B. Description of Related Art

AMPS is an analog system that permits communication by mobile units operating within an analog cell site. CDMA systems, on the other hand, are digital systems that permit communication by portable units operating within a CDMA footprint; i.e., a geographical area offering digital CDMA service. In a dual mode network, the CDMA system is overlaid on an analog AMPS.

Because both the AMPS and CDMA system operate concurrently in the dual mode network, some interference inherently occurs. Generally, there are four possible interference mechanisms between the AMPS and the CDMA system both operating in the 800–900 MHz frequency band (i.e., base station transmit frequency in the range of 869–894 MHz and receive frequency in the range of 824–849 MHz): (1) interference from AMPS sites to CDMA portable units; (2) interference from AMPS mobile units to CDMA sites; (3) interference from CDMA portable units to AMPS sites; and (4) interference from CDMA sites to AMPS mobile units.

Even an interfering AMPS site located far from the CDMA system might cause interference to CDMA portable units due to the AMPS site's power transmissions, antenna height, or other operating conditions. Any AMPS site that interferes with the CDMA system requires "clearing" of analog channels from the frequency band being used by the CDMA system. Clearing is an expression commonly used to refer to the action of decommissioning that part of the spectrum from a cell site.

If the AMPS site does not cause excessive interference to any CDMA portable unit due to a very high path loss, for example, the path loss from a mobile unit within the AMPS site's serving area may still cause interference to the CDMA system if the path loss between the AMPS mobile unit and the CDMA base station is very low. This may occur when an AMPS mobile unit transmits over water, from elevated highways or mountain roads, etc.

Conventional systems typically ignore such interference mechanisms. All of these interference mechanisms, however, must be considered in a proper analysis of guard zones and guard bands. A guard zone is a geographical area in which cell sites must have a portion of their spectrum cleared to reduce interference between the analog AMPS and the digital CDMA system. A guard band refers to the amount of spectrum, or frequency, that must be cleared at an AMPS site lying in the guard zone, when the digital and analog systems are overlaid.

Conventional systems typically implement a standard number of guard bands equal to 9 AMPS channels wide on either side of the CDMA carrier at each AMPS site. It had been thought that this number of guard bands was needed to preserve channel quality and minimize interference. The standard use of guard bands of 9 AMPS channels results, however, in an unnecessary loss of spectrum in the AMPS network.

As a result, a need exists for optimally selecting the number of guard bands to minimize the loss of spectrum in the AMPS network.

SUMMARY OF THE INVENTION

Systems and methods consistent with the present invention address this need by optimally selecting the number of guard bands to minimize the loss of spectrum in the AMPS while preserving channel quality and minimizing interference.

In accordance with the purpose of the invention as embodied and broadly described herein, a system consistent with the present invention identifies analog guard band channels for reclamation in a dual mode system having a digital network overlaid on an analog network. The digital network includes multiple digital cell sites. The analog network includes multiple analog cell sites. The system measures an amount of interference caused by the analog cell sites and an amount of interference caused to the digital cell sites. The system then compares the interference amounts to one or more thresholds and determines for which of the analog channels the interference amounts exceed the thresholds. The system selects the determined analog channels for reclamation.

In another implementation consistent with the present invention, a computer program product, stored on at least one memory device, identifies analog channels for reclamation in a dual mode system having a digital network overlaid on an analog network. The digital network include multiple digital sites, and the analog network includes multiple analog sites. The computer program product includes a forward link analysis module and a reverse link analysis module.

The forward link analysis module determines the first amount of interference caused by the analog sites to portable units operating in the digital sites, compares the first interference amount to a first threshold, and identifies analog channels for reclamation based on a result of the comparison. The reverse link analysis module determines the second amount of interference caused by mobile units operating in the analog sites to the digital sites, compares the second interference amount to a second threshold, and identifies analog channels for reclamation based on a result of the comparison.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention identify guard band channels that may be reclaimed for use by the AMPS in a dual mode network, where the CDMA system is overlaid on the AMPS. In some instances, it may be possible to reclaim one or more of the guard band channels while preserving channel quality and minimizing interference.

The interference analysis consistent with the present invention may be based on the EIA/TIA/IS-95A, IS-95B, IS-97, and IS-98 CDMA standards and the EIA/TIA/IS-19 and IS-20 AMPS standards.

Exemplary Network

Figure 1:
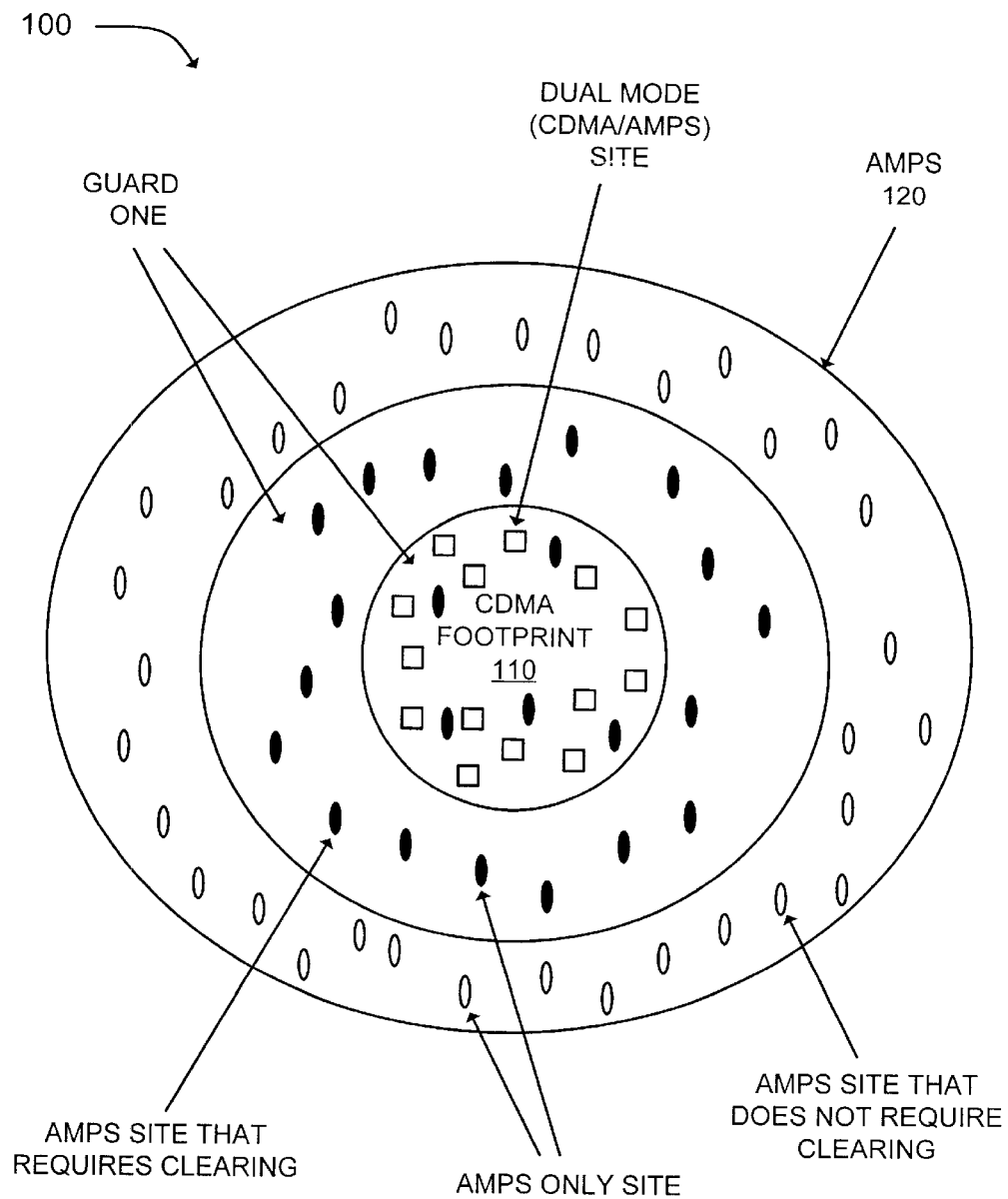
FIG. 1 is a diagram of a dual mode network in which systems and methods consistent with the present invention may be implemented.

FIG. 1 is a diagram of an exemplary dual mode network 100 in which systems and methods consistent with the present invention may be implemented. The network 100 includes a CDMA system (i.e., footprint) 110 overlaid on an AMPS 120. In the figure, dual mode cell sites (i.e., cell sites having CDMA overlaid on AMPS) are designated by squares and AMPS-only cell sites are designated by ovals.

The detailed description refers to mobile units as operating within the AMPS 120 and portable units as operating within the CDMA system 110. Typically, mobile units can transmit at a higher power than portable units. The following detailed description applies equally to portable units operating within the AMPS 120, mobile units operating within the CDMA system 110, and to stationary units that are not truly portable or mobile.

Exemplary Device

Figure 2:
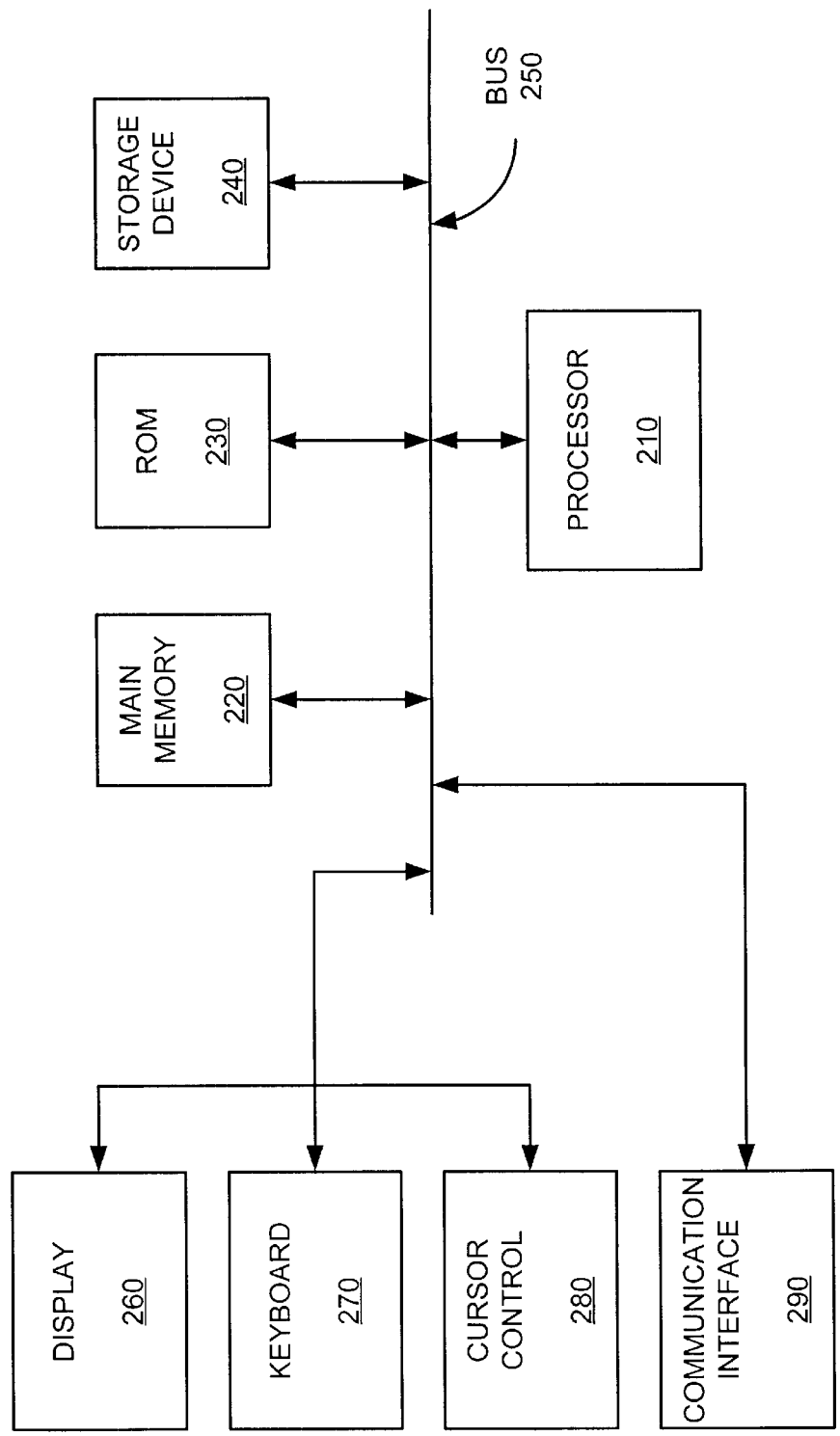
FIG. 2 is a block diagram of a computer device that may implement systems and methods consistent with the present invention.

FIG. 2 is a diagram of an exemplary device 200 on which systems and methods consistent with the present invention may be implemented. The device 200 includes a processor 210, main memory 220, a read only memory (ROM) 230, storage device 240, bus 250, display 260, keyboard 270, cursor control 280, and communication interface 290.

The processor 210 may include any type of conventional processing device that interprets and executes instructions. Main memory 220 may include a random access memory (RAM) or a similar dynamic storage device. Main memory 220 stores information and instructions for execution by processor 210. Main memory 220 may also be used for storing temporary variables or other intermediate information used during execution of instructions by processor 210.

ROM 230 stores static information and instructions for the processor 210. It will be appreciated that ROM 230 may be replaced with some other type of static storage device. The data storage device 240 may include any type of magnetic or optical recording medium and its corresponding drive. Data storage device 240 may store data and instructions for use by the processor 210. The bus 250 includes a set of hardware lines (i.e., conductors) that allows for data transfer among the components of the device 200.

The display 260 may be a cathode ray tube (CRT), or the like, for displaying information to an operator. The keyboard 270 and cursor control 280 allow the operator to interact with the device 200. The cursor control 280 may include, for example, a mouse.

The communication interface 290 enables the device 200 to communicate with other devices/systems via any communications medium. For example, the communication interface 290 may be a modem or an Ethernet interface to a LAN. Alternatively, the communication interface can be any other interface that enables communication between the device 200 and other devices or systems.

As will be described in detail below, a device 200, consistent with the present invention, optimally selects guard bands that require clearing in a dual mode network. The device 200 performs this task in response to the processor 210 executing sequences of instructions contained in, for example, memory 220. The instructions may be read into memory 220 from another computer-readable medium, such as the storage device 240, or from another device via the communication interface 290.

Execution of the sequences of instructions contained in memory 220 causes the processor 210 to perform processes that will be described later. Alternatively, hardwired circuitry may be used in place of or in combination with software instructions to implement processes consistent with the present invention. Thus, the present invention is not limited to any specific combination of hardware circuitry and software.

Exemplary Progessing

The dual mode network 100 (FIG. 1) includes a digital CDMA cellular system 110 (or footprint) overlaid on an analog AMPS 120. Each system 110 and 120 operates concurrently. An interference module analyzes interference between the two systems and determines the number of AMPS channels (i.e., guard band channels) that may be reclaimed at any analog site lying in the guard zone. In other words, the module identifies those of the 9 AMPS channels cleared by conventional systems that may be reclaimed and used by the AMPS 120. The interference analyzing module may include a computer, such as the device 200, that contains information on both the CDMA and AMPS networks, such as coverage, traffic, etc.

Generally, the interference analysis module consistent with the present invention uses a defined CDMA coverage area in conjunction with the CDMA traffic pattern to create a CDMA footprint for interference analysis. Based on the interference mechanism being analyzed, the interference power is computed at the mobile/portable unit's or site's location and then compared to a threshold that includes the transmitter and receiver filter protection and system loading characteristics. The threshold is a value or level consistent with a desired service quality objective. If the interference power exceeds this threshold, then the AMPS site is determined to be lying in the guard zone and the amount of spectrum that needs to be cleared at this site is calculated.

The guard zone analysis studies four kinds of mutual interference possible between the AMPS and the CDMA systems, including the interference from AMPS sites to CDMA portable units, the interference from AMPS mobile units to CDMA sites, the interference from CDMA portable units to AMPS sites, and the interference from CDMA sites to AMPS mobile units. The dominant sources of interference for identifying guard band channels for reclamation include interference from AMPS sites to CDMA portable units (i.e., forward link interference) and interference from AMPS mobile units to CDMA sites (i.e., reverse link interference).

The forward link interference is a function of the CDMA portable unit's forward link margin, its receive filter characteristics, and its thermal noise floor. The reverse link interference is a function of the CDMA site's rise above its thermal noise floor (i.e., system loading), its receive filter characteristics, and its thermal noise floor. Because these two sources of interference dominate, only these sources will be described below. In other implementations consistent with the present invention, all four sources of interference are considered. These sources are described in more detail in U.S. Pat. No. 5,960,329.

Figure 3A:
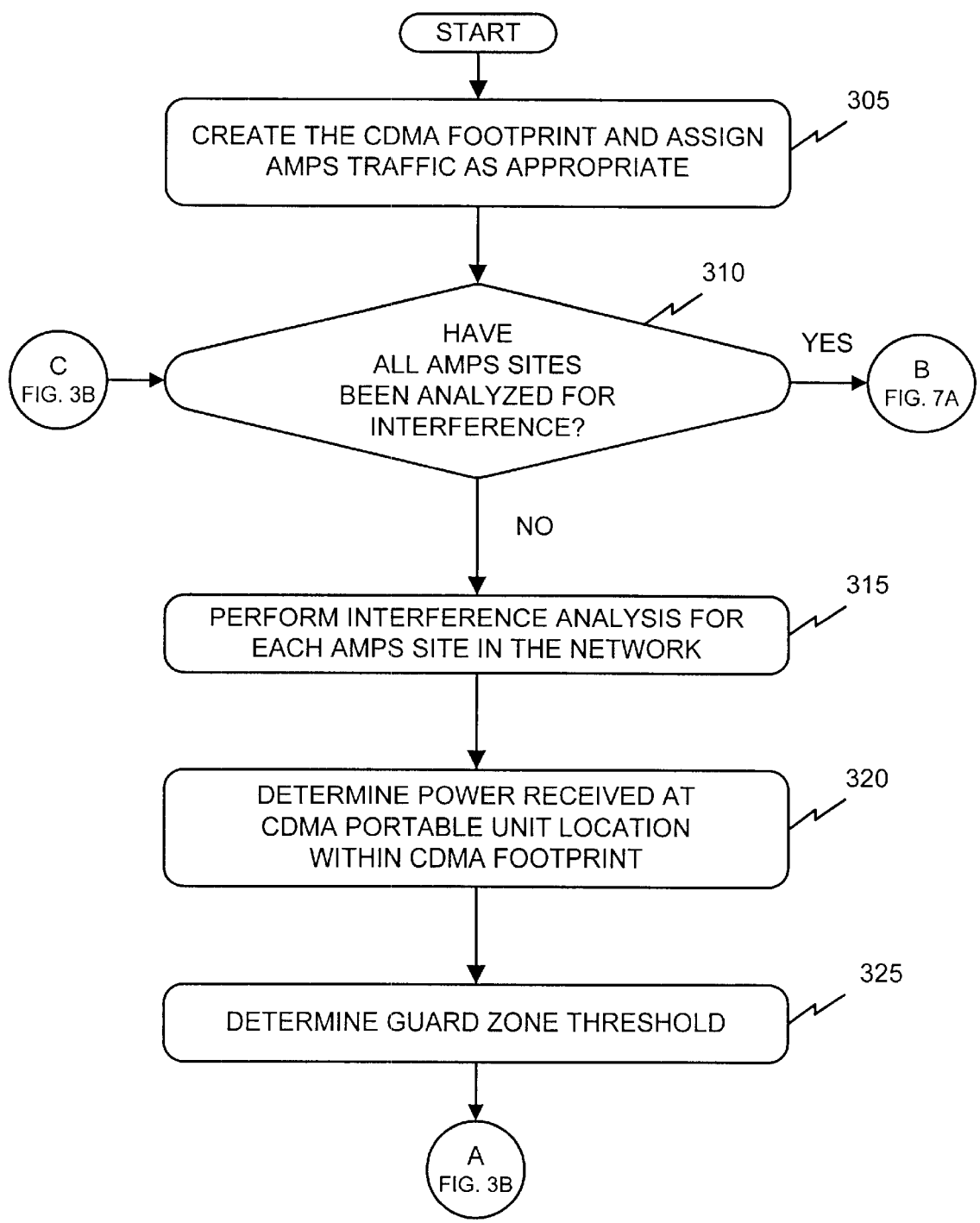
FIGS. 3A and 3B are flowcharts of processing for identifying guard band channels that may be reclaimed based on interference caused by AMPS sites to CDMA portable units in an implementation consistent with the present invention.
Figure 3B:
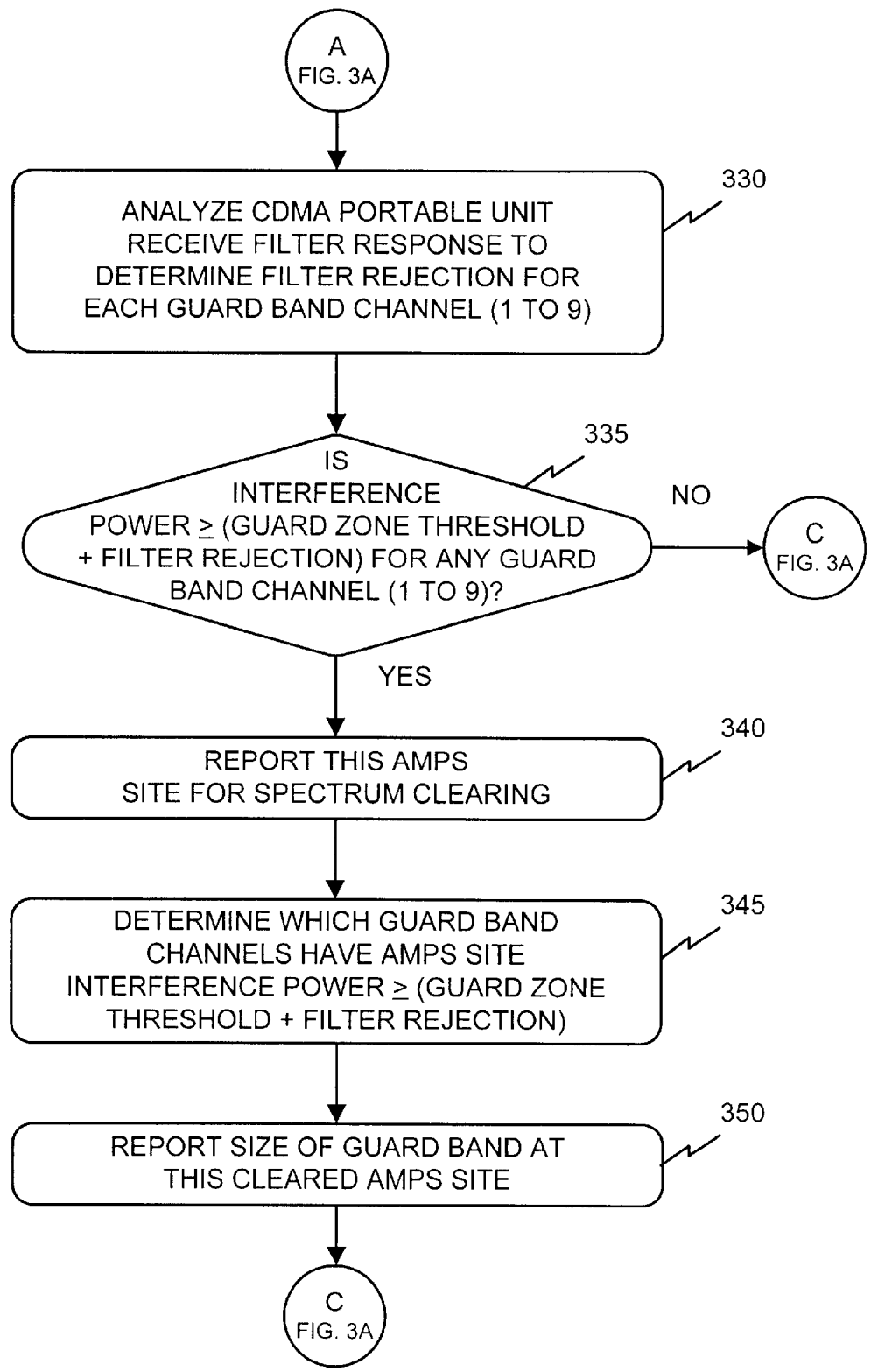

FIGS. 3A and 3B are flowcharts of processing for identifying guard band channels that may be reclaimed based on interference caused by AMPS sites to CDMA portable units in an implementation consistent with the present invention. An interference analysis module, such as the device 200, begins processing by creating a CDMA footprint and assigning traffic to the AMPS sites [step 310]. The device 200 may create the CDMA footprint by combining the CDMA coverage layer and the CDMA traffic layer. This serves to remove unwanted portable unit locations that have not been assigned traffic based on the Land Use Land Cover (LULC) categories present over the coverage area. In other words, only those CDMA portable unit locations that have a non-zero amount of Erlang traffic may be considered in the analysis. This ensures that no AMPS sites that are unlikely to cause interference are cleared.

In addition to creating the CDMA footprint, the device 200 assigns traffic (Erlangs/sector) to the AMPS sites [step 305]. The AMPS traffic assignment may be used to determine whether a mobile unit exists at a certain location, and might be arbitrarily set by the device 200 or user-defined.

Next, the device 200 determines whether all of the AMPS sites in the network have been analyzed for interference [step 310]. If some of the AMPS sites have not been analyzed, the device 200 performs analysis for each AMPS site in the network [step 315]. The device 200 begins the AMPS site analysis by computing the interference power from a selected AMPS site received at every CDMA portable unit location within the CDMA footprint [step 320].

For a CDMA portable unit location under consideration, the device 200 calculates the guard zone threshold based on the forward margin available, the handoff status, and the thermal noise floor [step 325]. The guard zone threshold is defined as the maximum AMPS interference power that can be tolerated by a CDMA portable unit at a specific location in the network. In general, the higher the guard zone threshold, the stronger the tolerance is to AMPS interference.

The guard zone threshold may be expressed as follows:

$$T_{GZ\_CDMA\_P} = (m_f - 1)N_p, \quad (1)$$

where $T_{GZ\_CDMA\_P}$ is the guard zone threshold; $m_f$ is the portable unit's forward link margin defined as the amount of increase that can be applied to the thermal noise floor at the portable units location so that the observed Eb/No still meets the minimum link requirement (Eb/No represents a ratio of the bit energy of the signal to the noise density in 1 Hz of bandwidth, and a minimum Eb/No is associated with any link for the system to operate satisfactorily); and $N_p$ is the CDMA portable unit's thermal noise floor.

The device 200 then analyzes the CDMA portable unit's receive filter response to determine the filter rejection for each of the guard band channels 1 through 9 [step 330] (FIG. 3B). For this analysis, the device 200 may determine whether the portable unit's receive filter response meets the receive filter mask required by the IS-95A/B standards.

Figure 4:
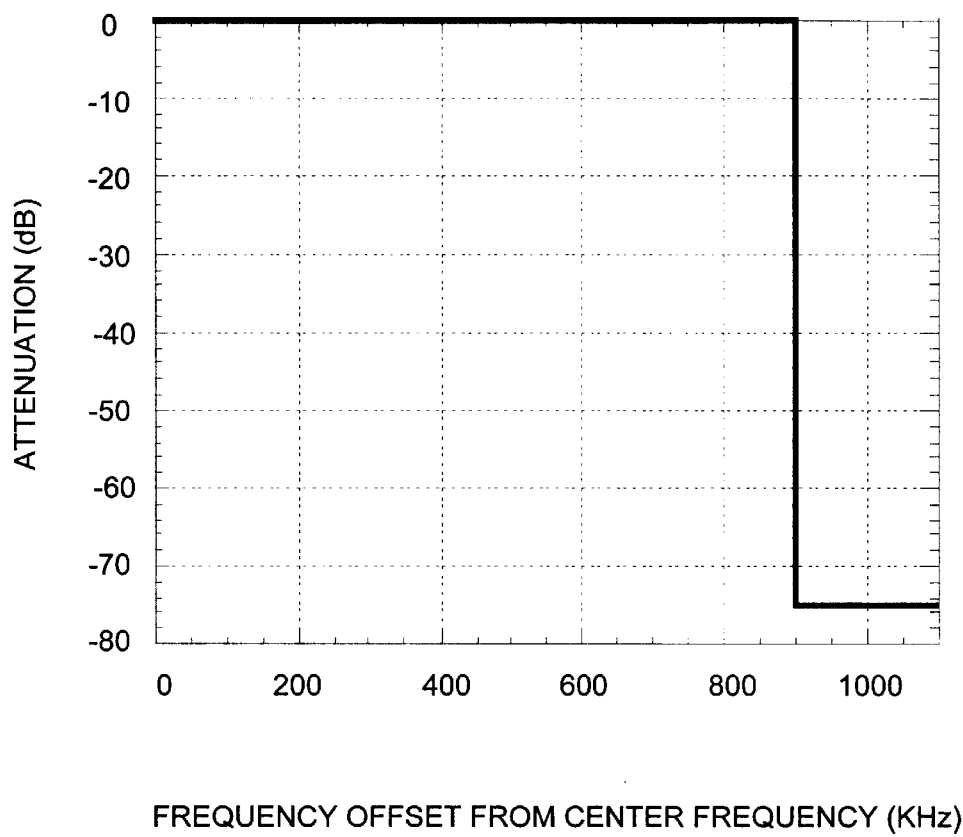
FIG. 4 is a graph of a CDMA portable unit's receive filter mask, as required by the IS-95A/B standards.

FIG. 4 is a graph of the CDMA portable unit's receive filter mask, as required by the IS-95A/B standards. The graph shows that the receive filter characteristics are constant across the CDMA bandwidth of 1.7688 MHz, which includes a 270 kHz guard band on either side of the CDMA frequency band of 1.2288 MHz, used in the guard zone analysis.

Two filters that satisfy the mask requirements of the portable unit's receive filter may be obtained from MatLab software developed by The MathWorks, Inc. (www.matlab.com). The first filter is a Kaiser filter of 37th order with a linear phase. The second filter is a Chebyshev Type 1 filter of 5th order. Because the Kaiser filter has a linear phase, it may provide better results than the Chebyshev Type 1 filter.

The following table illustrates guard band channels and corresponding appropriate filter rejections provided by a Kaiser filter of 37th order. The guard band channels are arranged in ascending order from one end of the CDMA carrier.

| Guard Band Channel Number | Approximate AMPS Channel Offset From Center Frequency of CDMA Carrier (kHz) | CDMA Portable Unit Filter Rejection (dB) |
|---|---|---|
| 1 | 640 | 0 |
| 2 | 670 | 0 |
| 3 | 700 | 0 |
| 4 | 730 | 2 |
| 5 | 760 | 5 |
| 6 | 790 | 10 |
| 7 | 820 | 20 |
| 8 | 850 | 30 |
| 9 | 880 | 50 |

The device 200 then determines whether the AMPS site causes interference to a CDMA portable unit determining whether the interference power from the AMPS site is greater than or equal to the combination of the guard zone threshold and the filter rejection for any of the guard band channels 1 through 9 [step 335]. This determination may be expressed as follows:

$$I_{AMPS} \geq T_{GZ\_CDMA\_} - 6 \text{ dB} + F_{CDMA\_P\_RF}(f), \quad (2)$$

where $I_{AMPS}$ is the interference power received from the AMPS site at the portable unit location; $T_{GZ\_CDMA\_P}$ is the guard zone threshold from (1) above; and $F_{CDMA\_P\_RF}(f)$ is the CDMA portable unit's receive filter rejection (FIG. 4). The 6 dB decrease in expression (2) ensures that the resulting elevation in the portable unit's noise floor due to the AMPS interference is only a trivial function of a dB.

If the interference power from the AMPS site is not greater than or equal to the combination of the guard zone threshold and the filter rejection for any guard band channel, processing returns to step 310 (FIG. 3A), where the device 200 determines whether all of the AMPS sites have been analyzed for interference. If the interference power is greater, however, the device 200 reports the AMPS site for spectrum clearing [step 340]. The device 200 may then determine in how many of the guard band channels the AMPS site's interference power is greater than or equal to the combination of the guard zone threshold and the filter rejection [step 345]. It is these guard band channels that may be reclaimed.

Figure 5:
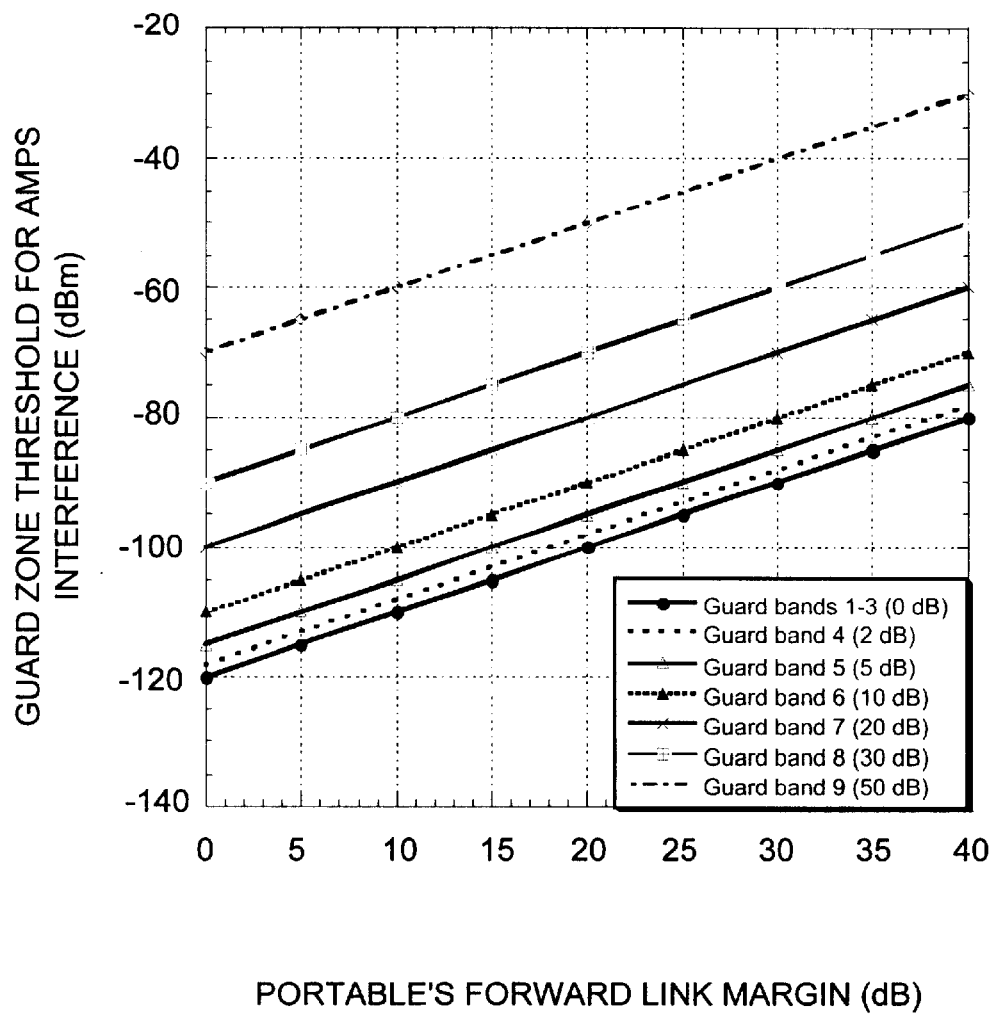
FIG. 5 is an exemplary graph illustrating guard zone threshold versus the available portable unit forward margin for different guard band channels.

FIG. 5 is an exemplary graph illustrating guard zone threshold versus the available portable unit forward margin for different guard band channels (i.e., AMPS channels 1–9). As the graph illustrates, the guard zone threshold increases with the portable unit's forward link margin. For a typical filter rejection of 20 dB, the guard zone threshold varies from –100 dBm to –60 dBm, depending on the available forward link margin. Even with zero forward link margin, guard band 7, for example, offers a threshold level of –100 dBm, which may be acceptable for satisfactory operation without substantial interference.

The CDMA portable units close to the dual mode site encounter very high interference from the co-located AMPS site. These portable units have a high forward link margin, however, and, thus, can tolerate higher values of AMPS interference. For example, as shown in FIG. 5, if the forward link margin in the core areas of the network is always greater than 15 dB, then reclaiming channel 9 means that the AMPS interference needs to be higher than –55 dBm to cause a problem. In practice, received power may be down to –60 dBm within 100 meters from the AMPS site. Of course, this would differ from region to region, but typically within 100 meters, the CDMA portable units are likely to have a higher value (higher than 15 dB) of forward link margin.

Figure 6:
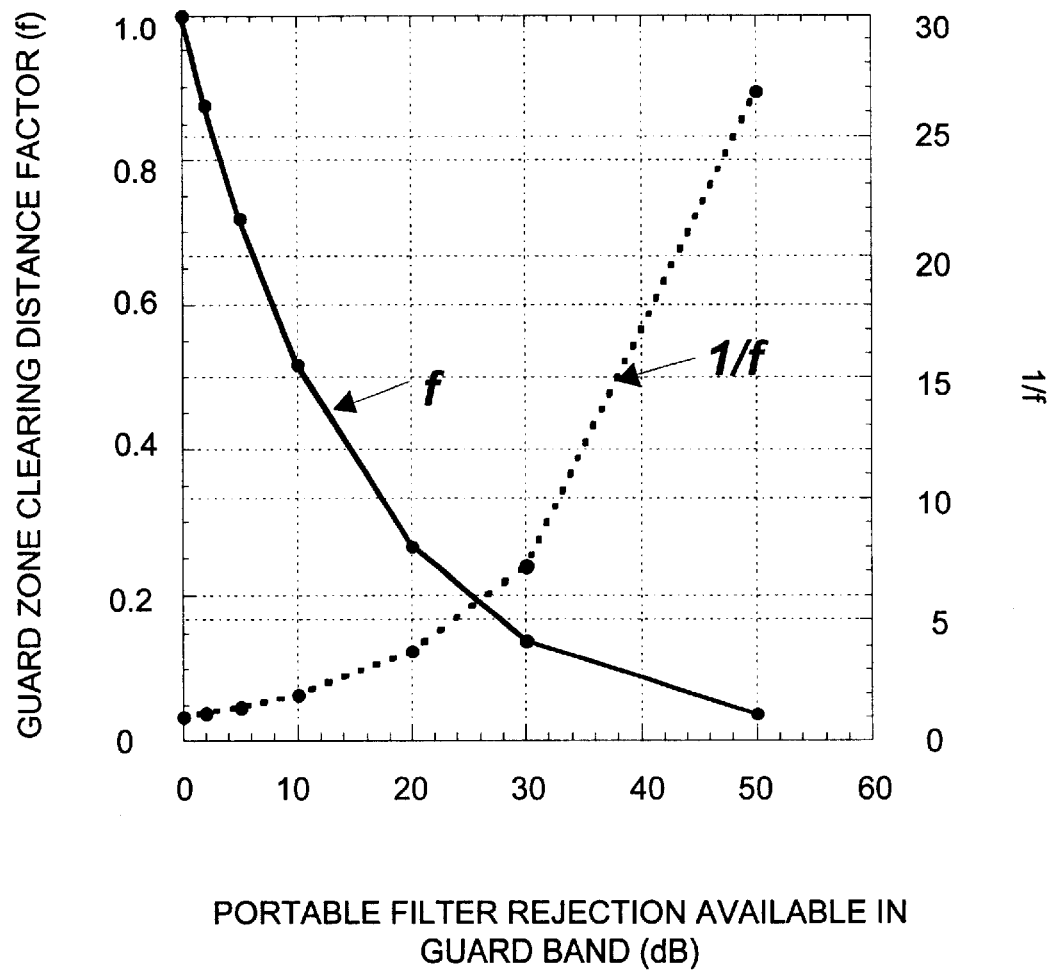
FIG. 6 is an exemplary graph of a guard zone clearing distance factor versus the filter rejection available in the guard bands.

FIG. 6 is an exemplary graph of a guard zone clearing distance factor (f) versus the filter rejection available in the guard bands. The factor f is based on a 35 dB path loss per decade and an AMPS site with an effective radiated power (ERP) of 50 watts, and is normalized to 1 for filter rejection of 0 dB. As shown, for a 50 dB filter rejection, f~0.037. In other words, the guard zone clearing distance for a 50 dB filter rejection is about 27 (1/0.037) times smaller than that for 0 dB filter rejection. As a result, the guard zone clearing distance increases with a decrease in available filter rejection or an increase in ERP of the AMPS site. This is indicated by an increase in the value of f.

Accordingly, guard band channels may be reclaimed even at the dual mode, co-located AMPS sites (i.e., inside the CDMA footprint). The reclamation is a function of the forward link margins available in the serving area of that co-located CDMA sector, the AMPS site's ERP (and all related propagation phenomena), and the CDMA portable unit's filter rejection available in that guard band.

The device 200 reports the size of the guard band (in terms of guard band channels) at the cleared AMPS site that may be reclaimed [step 350] and returns to step 310 (FIG. 3A) to determine whether all of the AMPS sites have been analyzed for interference. If all of the AMPS sites have been analyzed, the device 200 begins analysis for determining whether any guard band channels may be reclaimed based on interference caused by AMPS mobile units to CDMA sites.

Figure 7A:
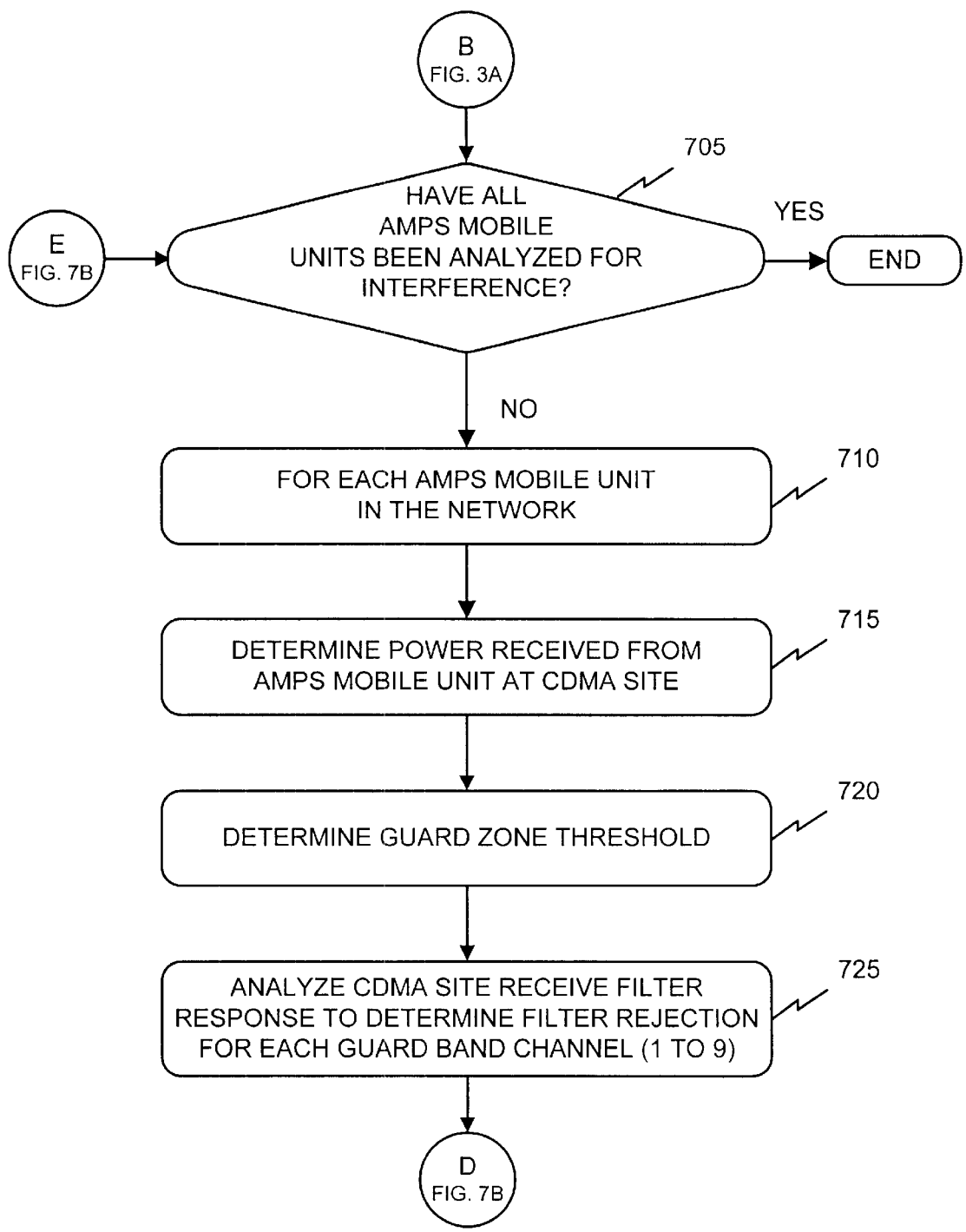
FIGS. 7A and 7B are flowcharts of processing for identifying guard band channels that may be reclaimed based on interference caused by AMPS mobile units to CDMA sites in an implementation consistent with the present invention.
Figure 7B:
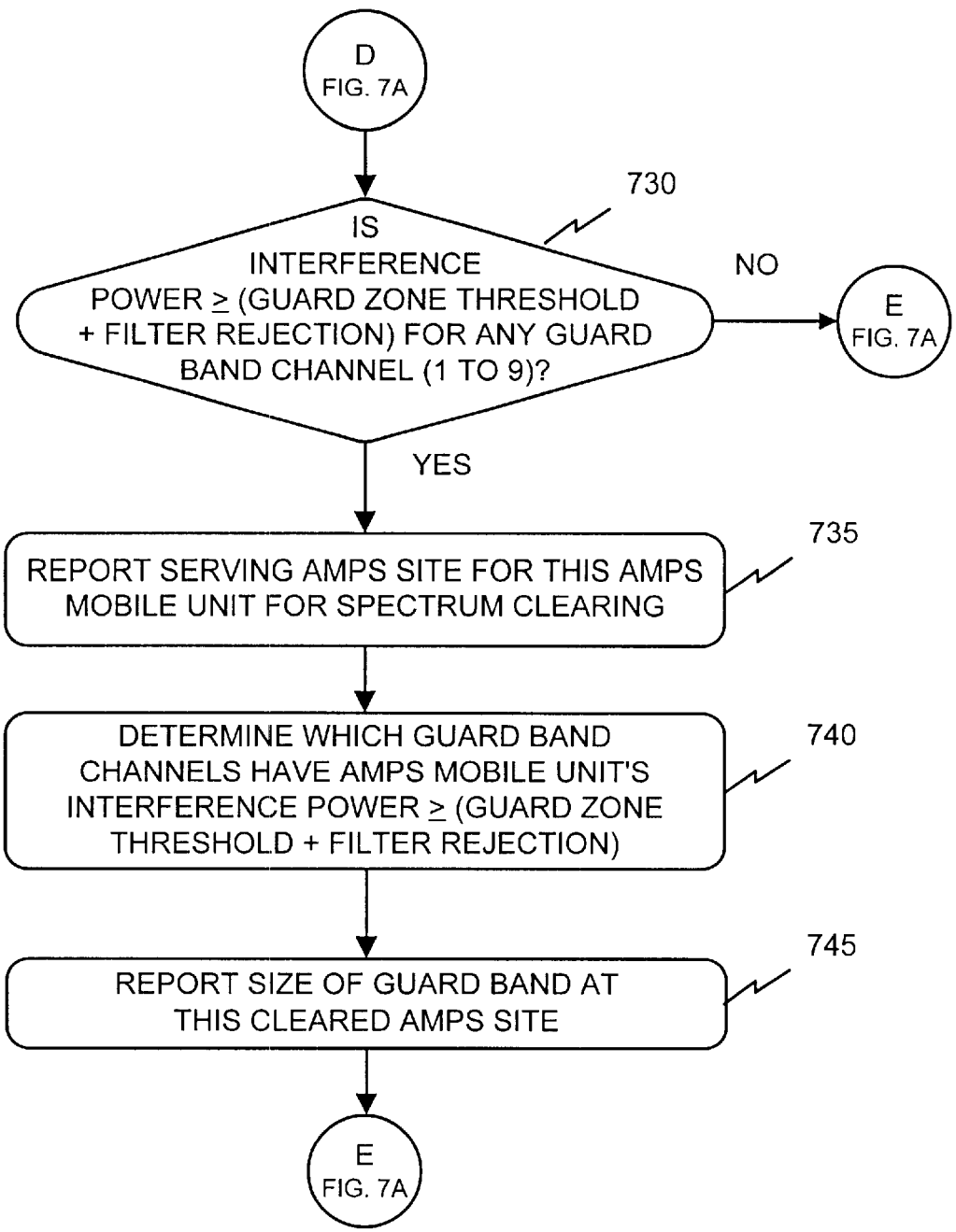

FIGS. 7A and 7B are flowcharts of processing for identifying guard band channels that may be reclaimed based on interference caused by AMPS mobile units to CDMA sites in an implementation consistent with the present invention. Processing begins with the device 200 determining whether all of the AMPS mobile units in the network have been analyzed for interference [step 705] (FIG. 7A).

If some of the AMPS mobile units have not been analyzed for interference, the device 200 performs analysis for each AMPS mobile unit in the network [step 710]. The device 200 begins the analysis by calculating for a selected AMPS mobile unit, the interference power from the mobile unit received at every CDMA site [step 715]. For a CDMA site under consideration, the device 200 calculates the guard zone threshold based on the CDMA site's thermal noise floor and any rise above the thermal noise floor due to multi-user traffic [step 720]. In this case, the guard zone threshold is defined as the maximum AMPS interference power that can be tolerated by a CDMA site at a specific location in the network. In general, the higher the guard zone threshold, the stronger the tolerance is to AMPS interference.

The guard zone threshold may be determined as follows:

$$T_{GZ\_CDMA\_S} = N_s + N_{elev}, \quad (3)$$

where $T_{GZ\_CDMA\_S}$ is the guard zone threshold; $N_s$ is the CDMA site's thermal noise floor; and $N_{elev}$ is the elevation in the CDMA site's noise floor due to multi-user traffic.

Figure 8:
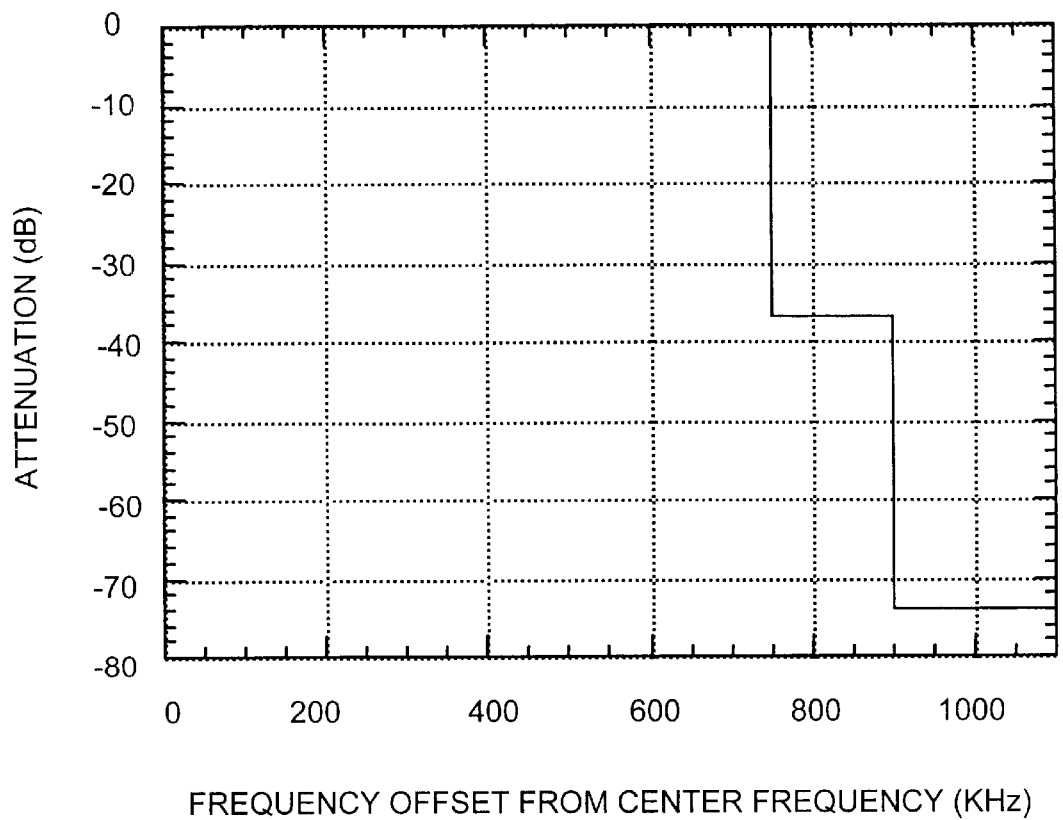
FIG. 8 is a graph of a CDMA site's receive filter mask, as required by the IS-95A/B standards.

The device 200 analyzes the CDMA site's receive filter response to determine the filter rejection for each of the guard band channels 1 through 9 [step 725]. For this analysis, the device 200 may determine whether the site's receive filter response meets the receive filter mask required by the IS-95A/B standards. FIG. 8 is a graph of a CDMA site's receive filter mask, as required by the IS-95A/B standards. The graph shows that the CDMA site's receive filter response has two breakpoints at approximately 750 kHz and 900 kHz.

The device 200 then determines whether the AMPS mobile unit causes interference to a CDMA site by determining whether the interference power from the AMPS mobile unit is greater than or equal to the combination of the guard zone threshold and the filter rejection for any of the guard band channels 1 through 9 [step 730] (FIG. 7B). This determination may be expressed as follows:

$$I_{AMPS} \geq T_{GZ\_CDMA\_S} - 6 \text{ dB} + F_{CDMA\_S\_RF}(f), \quad (4)$$

where $I_{AMPS}$ is the interference power received from the AMPS mobile unit at the site location; $T_{GZ\_CDMA\_S}$ is the guard zone threshold from (3) above; and $F_{CDMA\_S\_RF}(f)$ is the CDMA site's receive filter rejection (FIG. 8). As in expression (2), the 6 dB decrease ensures that the resulting elevation in the noise floor of the CDMA site due to the AMPS mobile unit interference is set to a tolerable level.

If the interference power from the AMPS mobile unit is not greater than or equal to the combination of the guard zone threshold and the filter rejection for any of the guard band channels, processing returns to step 705 (FIG. 7A), where the device 200 determines whether all of the AMPS mobile units have been analyzed for interference. If the interference power is greater, however, the device 200 reports the serving AMPS site for this AMPS mobile unit for spectrum clearing [step 735]. After reporting the AMPS site for spectrum clearing, the device 200 may determine in how many guard band channels the AMPS mobile unit's interference power is greater than or equal to the combination of the guard zone threshold and the filter rejection [step 740]. These guard bands may then be reclaimed.

Figure 9:
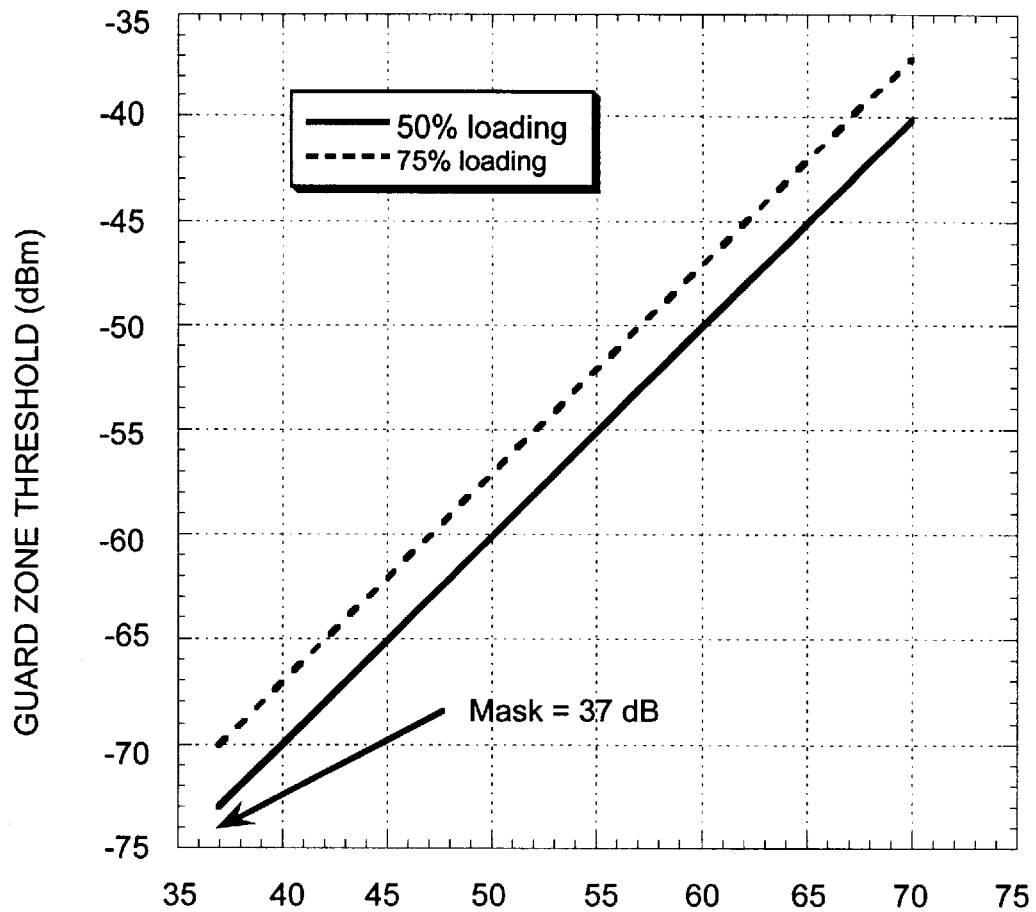
FIG. 9 is an exemplary graph illustrating guard zone threshold for AMPS mobile unit interference at the CDMA site's location versus the site's available receive filter rejection.

FIG. 9 is an exemplary graph illustrating guard zone threshold for AMPS mobile unit interference at the CDMA site's location versus the site's available receive filter rejection. As the graph illustrates, the guard zone threshold increases with the available CDMA site's receive filter rejection in the guard bands. For a minimum mask requirement of 37 dB protection in the guard band channels 6 to 9, for example, the guard zone threshold is −73 dBm for 50% system loading and −70 dBm for 75% system loading. For a typical filter rejection of 50 dB, the thresholds reduce to −60 dBm and −57 dBm, respectively, depending on the CDMA system loading. Even the mask level of filter rejection offers a threshold of −73 dBm, which may be acceptable for satisfactory operation without substantial interference. For most environments, the receiver sensitivity level for an AMPS mobile unit is set around −75 dBm and, hence, power control would ensure that the AMPS mobile units have a low transmit power at locations close to the CDMA site.

Accordingly, the guard band channels may be reclaimed even at the dual mode, co-located AMPS sites (i.e., those sites inside the CDMA footprint). The guard band channel reclamation is a function of the AMPS mobile unit's transmit power (especially at locations close to the co-located CDMA site), the CDMA system loading, and the CDMA site's filter rejection available in that guard band.

The device 200 reports the size of the guard band (in terms of guard band channels) at the cleared AMPS site that may be reclaimed [step 745] and returns to step 705 (FIG. 7A) to determine whether all of the AMPS mobile units have been analyzed for interference. If all of the mobile units have been analyzed, processing ends. The device 200 may then generate a guard zone report listing all of the AMPS sites where the frequency spectrum needs to be cleared, the number of AMPS channels to be cleared in these sites, and the number of AMPS channels that may be reclaimed in these sites. This report might include the AMPS sites' names with their corresponding sector numbers, their type (AMPS only or dual mode), the AMPS channel numbers that need to be cleared, and the AMPS channel numbers that may be reclaimed.

CONCLUSION

Systems and methods consistent with the present invention facilitate the reclamation of guard band channels in dual mode networks. Based on the forward link interference analysis from the AMPS sites to the CDMA portable units, particular guard band channels may be reclaimed under certain conditions. Such reclamation is a function of the portable unit forward link margins available in the serving area of that co-located CDMA sector, the AMPS site's ERP (and all related propagation phenomena) and the portable unit's filter rejection available in these guard bands.

Based on the reverse link interference analysis from the AMPS mobile units to the CDMA sites, particular guard band channels may be reclaimed under certain conditions. This reclamation is a function of the AMPS mobile unit's transmit power (or the efficiency of the power control especially at locations close to the co-located CDMA site), the CDMA system W loading, and the CDMA site's filter rejection available in these guard bands.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method for identifying analog channels for reclamation in a dual mode system having a digital network overlaid on an analog network, the digital network including a plurality of digital cell sites, and the analog network including a plurality of analog cell sites, the method comprising:

measuring an amount of interference caused by the analog cell sites;

measuring an amount of interference caused to the digital cell sites;

individually comparing the interference amounts to one or more thresholds;

determining for which of a plurality of analog channels the interference amounts exceed the one or more thresholds; and selecting the determined analog channels for reclamation.

2. The method of claim 1, wherein the analog cell sites interference measuring includes:

identifying an amount of interference power from the analog cell sites that is received by each of a plurality of portable units operating in the digital cell sites.

3. The method of claim 1, wherein the analog cell sites interference measuring includes:

ascertaining a maximum interference from the analog cell sites that can be tolerated by a portable unit operating in one of the digital cell sites.

4. The method of claim 3, wherein the ascertaining includes:

determining the maximum interference using at least one of an available forward margin, a handoff status, and a noise floor.

5. The method of claim 3, wherein the individually comparing includes:

using the ascertained maximum interference as a guard zone threshold, and comparing the amount of interference caused by the analog cell sites to the guard zone threshold.

6. The method of claim 1, wherein the analog cell sites interference measuring includes:

determining a receive filter rejection for each of the analog channels.

7. The method of claim 6, wherein the determining a receive filter rejection includes:

analyzing a receive filter response for each of a plurality of portable units operating in the digital cell sites to determine the receive filter rejection for each of the analog channels.

8. The method of claim 1, wherein the digital cell sites interference measuring includes:

identifying an amount of interference power from each of a plurality of mobile units operating in the analog cell sites that is received at each of the digital cell sites.

9. The method of claim 1, wherein the digital cell sites interference measuring includes:

ascertaining a maximum interference from mobile units operating in the analog cell sites that can be tolerated by each of the digital cell sites.

10. The method of claim 9, wherein the ascertaining includes:

determining the maximum interference based on a noise floor of the digital cell sites.

11. The method of claim 9, wherein the individually comparing includes:

using the ascertained maximum interference as a guard zone threshold, and comparing the measured amount of interference at the digital cell sites to the guard zone threshold.

12. The method of claim 1, wherein the digital cell sites interference measuring includes:

determining a filter rejection for each of the analog channels.

13. The method of claim 12, wherein the determining a filter rejection includes:

analyzing a receive filter response for each of the digital cell sites to determine the filter rejections.

14. A system for identifying analog channels for reclamation in a dual mode system having a digital network overlaid on an analog network, the digital network including a plurality of digital cell sites, and the analog network including a plurality of analog cell sites, the system comprising:

means for measuring an amount of interference caused by the analog cell sites;

means for measuring an amount of interference caused to the digital cell sites;

means for comparing the interference amounts to one or more thresholds;

means for determining for which of a plurality of analog channels the interference amounts exceed the one or more thresholds; and means for selecting the determined analog channels for reclamation.

15. A system for identifying analog channels for reclamation in a dual mode system having a digital network overlaid on an analog network, the digital network including a plurality of digital sites, and the analog network including a plurality of analog sites, the system comprising:

a memory configured to store instructions; and a processor configured to execute the instructions in the memory to measure a first amount of interference caused by the analog sites, measure a second amount of interference caused to the digital sites, compare the first interference amount to a first threshold, compare the second interference amount to a second threshold, determine for which of a plurality of analog channels the first and second interference amounts respectively exceed the first and second thresholds, and select the determined analog channels for reclamation.

16. The system of claim 15, wherein the processor is configured to identify an amount of interference power from the analog sites that is received by each of a plurality of portable units operating in the digital sites to measure the first interference amount.

17. The system of claim 15, wherein the processor is configured to ascertain a maximum interference from the analog sites that can be tolerated by a portable unit operating in one of the digital sites to measure the first interference amount.

18. The system of claim 17, wherein the processor is configured to determine the maximum interference using at least one of an available forward margin, a handoff status, and a noise floor.

19. The system of claim 17, wherein the processor is configured to use the ascertained maximum interference as a guard zone threshold, and compare the amount of interference caused by the analog sites to the guard zone threshold.

20. The system of claim 15, wherein the processor is configured to determine a receive filter rejection for each of the analog channels.

21. The system of claim 20, wherein the processor is configured to analyze a receive filter response for each of a plurality of portable units operating in the digital sites to determine the receive filter rejection for each of the analog channels.

22. The system of claim 15, wherein the processor is configured to identify an amount of interference power from each of a plurality of mobile units operating in the analog sites that is received at each of the digital sites to measure the second interference amount.

23. The system of claim 15, wherein the processor is configured to ascertain a maximum interference from mobile units operating in the analog sites that can be tolerated by each of the digital sites to measure the second interference amount.

24. The system of claim 23, wherein the processor is configured to determine the maximum interference based on a noise floor of the digital sites.

25. The system of claim 23, wherein the processor is configured to use the ascertained maximum interference as a guard zone threshold, and compare the measured amount of interference at the digital sites to the guard zone threshold.

26. The system of claim 15, wherein the processor is configured to determine a filter rejection for each of the analog channels.

27. The method of claim 26, wherein the processor is configured to analyze a receive filter response for each of the digital sites to determine the filter rejections.

28. A computer-readable medium containing instructions for causing at least one processor to perform a method for identifying analog channels for reclamation in a dual mode system having a digital network overlaid on an analog network, the digital network including a plurality of digital sites, and the analog network including a plurality of analog sites, the method comprising:

measuring an amount of interference caused by the analog sites to portable units operating in the digital sites;

measuring an amount of interference caused to the digital sites by mobile units operating in the analog sites;

individually comparing the interference amounts to one or more thresholds;

determining for which of a plurality of analog channels the interference amounts exceed the one or more thresholds; and selecting the determined analog channels for reclamation.

29. A computer program product, stored on at least one memory device, for identifying analog channels for reclamation in a dual mode system having a digital network overlaid on an analog network, the digital network including a plurality of digital sites, and the analog network including a plurality of analog sites, the computer program product comprising:

a forward link analysis module configured to determine a first amount of interference caused by the analog sites to portable units operating in the digital sites, compare the first interference amount to a first threshold, and identify analog channels for reclamation based on a result of the comparison; and a reverse link analysis module configured to determine a second amount of interference caused by mobile units operating in the analog sites to the digital sites, compare the second interference amount to a second threshold, and identify analog channels for reclamation based on a result of the comparison.

* * * * *